US010896785B2

(12) United States Patent
Kano et al.

(10) Patent No.: US 10,896,785 B2
(45) Date of Patent: Jan. 19, 2021

(54) ELECTRIC STORAGE ELEMENT

(71) Applicant: TAIYO YUDEN CO., LTD., Tokyo (JP)

(72) Inventors: Koji Kano, Takasaki (JP); Katsunori Yokoshima, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 282 days.

(21) Appl. No.: 15/890,209

(22) Filed: Feb. 6, 2018

(65) Prior Publication Data

US 2018/0233301 A1 Aug. 16, 2018

(30) Foreign Application Priority Data

Feb. 10, 2017 (JP) ................. 2017-022917

(51) Int. Cl.
| | |
|---|---|
| *H01G 11/68* | (2013.01) |
| *H01M 4/66* | (2006.01) |
| *H01M 4/96* | (2006.01) |
| *H01G 11/32* | (2013.01) |
| *H01G 11/52* | (2013.01) |
| *H01G 11/28* | (2013.01) |
| *H01M 10/056* | (2010.01) |
| *H01M 2/18* | (2006.01) |
| *H01M 10/052* | (2010.01) |
| *H01M 10/04* | (2006.01) |
| *H01M 2/16* | (2006.01) |
| *H01G 11/82* | (2013.01) |
| *H01G 11/06* | (2013.01) |
| *H01M 10/0587* | (2010.01) |
| *H01M 4/02* | (2006.01) |
| *H01M 10/0525* | (2010.01) |

(52) U.S. Cl.
CPC ............ *H01G 11/68* (2013.01); *H01G 11/06* (2013.01); *H01G 11/28* (2013.01); *H01G 11/32* (2013.01); *H01G 11/52* (2013.01); *H01G 11/82* (2013.01); *H01M 2/1673* (2013.01); *H01M 2/18* (2013.01); *H01M 4/668* (2013.01); *H01M 4/96* (2013.01); *H01M 10/0431* (2013.01); *H01M 10/052* (2013.01); *H01M 10/056* (2013.01); *H01M 10/0587* (2013.01); *H01M 10/0525* (2013.01); *H01M 2004/027* (2013.01); *H01M 2004/028* (2013.01); *Y02E 60/13* (2013.01)

(58) Field of Classification Search
CPC ........ H01G 11/06; H01G 11/28; H01G 11/32; H01G 11/68; H01G 11/82; H01M 2/1673; H01M 2/18; H01M 4/668; H01M 4/96; H01M 10/0431; H01M 10/052; H01M 10/0525; H01M 10/056; H01M 10/0587; H01M 2004/027; H01M 2004/028; Y02E 60/13

See application file for complete search history.

(56) References Cited

U.S. PATENT DOCUMENTS

| | | | |
|---|---|---|---|
| 2014/0011076 A1 | 1/2014 | Kanemoto et al. | |
| 2014/0120417 A1 | 5/2014 | Matsushita et al. | |
| 2014/0125292 A1* | 5/2014 | Best .................. | H01M 10/0525 320/137 |

FOREIGN PATENT DOCUMENTS

| | | |
|---|---|---|
| CN | 103794749 A | 5/2014 |
| JP | 2000277155 A | 10/2000 |
| JP | 2004303590 A | 10/2004 |
| JP | 2004311282 A | 11/2004 |
| JP | 2006260892 A | 9/2006 |
| JP | 2006260904 A | 9/2006 |
| JP | 2007157812 A | 6/2007 |
| JP | 2010055906 A | 3/2010 |
| JP | 2012069828 A | 4/2012 |
| JP | 2012114161 A | 6/2012 |
| JP | 2015043257 A | 3/2015 |
| JP | 2017174998 A | 9/2017 |
| WO | 2012133233 A1 | 10/2012 |
| WO | 2013094100 A1 | 6/2013 |

OTHER PUBLICATIONS

A Second Office Action issued by the State Intellectual Property Office of China dated Dec. 4, 2019, for Chinese counterpart application No. 201810133366.4. (5 pages).
A Notification of Reasons for Refusal issued by the Japanese Patent Office, dated Dec. 4, 2018, for related Japanese application No. 2017-022917 (4 pages).
A First Office Action issued by the State Intellectual Property Office of China dated May 21, 2019, for Chinese counterpart application No. 201810133386.4. (8 pages).

(Continued)

*Primary Examiner* — Anca Eoff
(74) *Attorney, Agent, or Firm* — Law Office of Katsuhiro Arai (57) ABSTRACT

In an electric storage element, a negative electrode has a negative-electrode collector and a negative-electrode active material layer provided on a principal face of the negative-electrode collector, the positive electrode having a positive-electrode collector and a positive-electrode active material layer provided on a principal face of the positive-electrode collector, and the separator insulating the negative electrode and the positive electrode, are stacked and wound together. A negative-electrode terminal and a positive-electrode terminal are electrically connected to the negative-electrode collector and the positive-electrode collector, respectively, and projects from a winding structure along a direction of a center axis of winding. A first protective tape covers the negative-electrode terminal and has lower ion permeability than that of the separator. The positive electrode has, in a part facing the first protective tape via the separator, a first region for inhibiting release of lithium ions therefrom.

12 Claims, 9 Drawing Sheets

(56) References Cited

OTHER PUBLICATIONS

A Notification of Reasons for Refusal issued by the Korean Patent Office, dated Mar. 20, 2019, for Korean counterpart application No. 1020180014450. (7 pages).

* cited by examiner

ELECTRIC STORAGE ELEMENT

CROSS-REFERENCE TO RELATED APPLICATIONS

The present application claims priority to Japanese Patent Application No. 2017-022917, filed Feb. 10, 2017, the disclosure of which is incorporated herein by reference in its entirety including any and all particular combinations of the features disclosed therein.

BACKGROUND

Field of the Invention

The present invention relates to an electric storage element that includes current collectors and active material layers.

Description of the Related Art

Lithium ion capacitors are a representative example of electrochemical devices. Some lithium ion capacitors are structured in such a way that a positive electrode, a negative electrode, and a separator insulating the positive electrode and the negative electrode, are wound together to make an electric storage element, and this electric storage element is housed in a cylindrical housing. The positive electrode and negative electrode each have an electrode terminal connected to it. The negative-electrode terminal is covered with a protective tape of low ion permeability so that it will not come in contact with the lithium ions in the electrolyte (refer to Patent Literature 1, for example). This suppresses deposition of metal lithium onto the negative-electrode terminal.

BACKGROUND ART LITERATURES

[Patent Literature 1] Japanese Patent Laid-open No. 2012-114161

SUMMARY

However, the protective tape covering the negative-electrode terminal also covers the negative electrode around the negative-electrode terminal. Where covered by the protective tape, the negative electrode no longer absorbs the lithium ions easily during charge, for example. As a result, parts of the negative electrode other than where the negative-electrode terminal is attached may receive load, depending on the charge speed, in which case lithium ions may not be absorbed uniformly across the entire negative electrode, and metal lithium may deposit onto the negative electrode in specific locations.

In light of the aforementioned situation, an object of the present invention is to provide an electric storage element offering improved reliability because its negative electrode absorbs lithium ions more uniformly.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the electric storage element pertaining to an embodiment of the present invention comprises a winding structure, a negative-electrode terminal, a positive-electrode terminal, and a first protective tape.

The winding structure comprises: a negative electrode having a negative-electrode collector and a negative-electrode active material layer provided on a principal face of the negative-electrode collector; a positive electrode having a positive-electrode collector and a positive-electrode active material layer provided on a principal face of the positive-electrode collector; and a separator insulating the negative electrode and the positive electrode. The negative electrode, positive electrode and separator are stacked and wound together, with the negative electrode and the positive electrode separated by the separator.

The negative-electrode terminal is electrically connected to the negative-electrode collector, extends through the winding structure along the direction of the center axis of winding of the winding structure, and projects from the winding structure.

The positive-electrode terminal is electrically connected to the positive-electrode collector, extends through the winding structure along the direction of the center axis of winding, and projects from the winding structure.

The first protective tape covers the negative-electrode terminal and has lower ion permeability than that of the separator.

The positive electrode has, in a part facing the first protective tape via the separator, a first region where release of lithium ions can be suppressed.

According to such electric storage element, even when the negative-electrode terminal is covered by the first protective tape whose ion permeability is lower than that of the separator, the positive electrode still has, in the part facing the first protective tape via the separator, the first region where release of lithium ions can be suppressed. This means that, even when parts of the negative electrode other than where the negative-electrode terminal is attached receive load during charge, metal lithium no longer deposits easily in these parts of the negative electrode, and lithium ions are absorbed more uniformly across the entire negative electrode during charge. As a result, the reliability of the electric storage element improves.

With the aforementioned electric storage element, the positive-electrode active material layer may be covered, in the first region, by a second protective tape whose ion permeability is lower than that of the separator.

This means that, because the first region of the positive electrode is covered by the second protective tape, and release of lithium ions in the first region is suppressed.

With the aforementioned electric storage element, the thickness of the positive-electrode active material layer in the first region may be smaller than the thickness of the positive-electrode active material layer outside the first region, or the positive-electrode active material layer may not be provided in the first region.

This means that, because the first region of the positive electrode is structured in such a way that the thickness of the positive-electrode active material layer is smaller than the thickness of the positive-electrode active material layer outside the first region, or because the positive-electrode active material layer is not provided in the first region, release of lithium ions is suppressed in the first region.

With the aforementioned electric storage element, the width of the first region may be equal to or smaller than the width of the first protective tape in the winding direction of the winding structure.

This means that, because the first region is structured in such a way that its width is equal to or smaller than the width of the first protective tape, lithium ions diffuse more uniformly, during charge/discharge of the electric storage element, in the direction from the center axis of winding toward the outer periphery of the winding structure, or in the direction from the outer periphery of the winding structure toward the center axis of winding.

With the aforementioned electric storage element, a third protective tape that covers the negative-electrode terminal from the direction opposite the first protective tape may further be provided, and the third protective tape may have lower ion permeability than that of the separator.

This means that, because the negative-electrode terminal is covered by the third protective tape from the direction opposite the first protective tape, deposition of metal lithium onto the negative-electrode terminal is suppressed further.

With the aforementioned electric storage element, the positive electrode may further have, in a part facing the third protective tape via the separator, a second region where release of lithium ions can be suppressed, and the negative-electrode terminal may be positioned between the first region and the second region.

This means that, because the positive electrode has, in the part facing the third protective tape via the separator, the second region where release of lithium ions can be suppressed, metal lithium no longer deposits easily onto parts of the negative electrode other than where the negative-electrode terminal is attached, and consequently lithium ions are absorbed more uniformly across the entire negative electrode during charge.

With the aforementioned electric storage element, the positive-electrode active material layer may be covered, in the second region, by a fourth protective tape whose ion permeability is lower than that of the separator.

This means that, because the second region of the positive electrode is covered by the fourth protective tape, release of lithium ions is suppressed in the second region.

With the aforementioned electric storage element, the thickness of the positive-electrode active material layer in the second region may be smaller than the thickness of the positive-electrode active material layer outside the first region and the second region, or the positive-electrode active material layer may not be provided in the second region.

This means that, because the second region of the positive electrode is structured in such a way that the thickness of the positive-electrode active material layer is smaller than the thickness of the positive-electrode active material layer outside the first region and the second region, or because the positive-electrode active material layer is not provided in the second region, release of lithium ions is suppressed in the first region.

With the aforementioned electric storage element, the width of the second region may be equal to or greater than the width of the third protective tape in the winding direction of the winding structure.

This means that, because the second region is structured in such a way that its width is equal to or greater than the width of the third protective tape, lithium ions diffuse more uniformly, during charge/discharge of the electric storage element, in the direction from the center axis of winding toward the outer periphery of the winding structure, or in the direction from the outer periphery of the winding structure toward the center axis of winding.

Also, to achieve the aforementioned object, the electric storage element pertaining to an embodiment of the present invention comprises a winding structure, a negative-electrode terminal, a positive-electrode terminal, and a protective tape.

The winding structure comprises: a negative electrode having a negative-electrode collector and a negative-electrode active material layer provided on a principal face of the negative-electrode collector; a positive electrode having a positive-electrode collector and a positive-electrode active material layer provided on a principal face of the positive-electrode collector; and a separator insulating the negative electrode and the positive electrode. The negative electrode, positive electrode and separator are stacked and wound together, with the negative electrode and the positive electrode separated by the separator.

The negative-electrode terminal is electrically connected to the negative-electrode collector, extends through the winding structure along the center axis of winding of the winding structure, and projects from the winding structure.

The positive-electrode terminal is electrically connected to the positive-electrode collector, extends through the winding structure along the center axis of winding, and projects from the winding structure.

The protective tape covers the negative-electrode terminal and has lower ion permeability than that of the separator.

The negative electrode has, in a part facing the protective tape via the separator and positive electrode, a third region where absorption of lithium ions can be suppressed.

According to such electric storage element, even when the negative-electrode terminal is covered by the protective tape whose ion permeability is lower than that of the separator, the negative electrode still has, in the part facing the protective tape via the separator and positive electrode, the third region where absorption of lithium ions can be suppressed. This means that, even when parts of the negative electrode other than where the negative-electrode terminal is attached receive load during charge, metal lithium no longer deposits easily in these parts of the negative electrode, and lithium ions are absorbed more uniformly across the entire negative electrode during charge. As a result, the reliability of the electric storage element improves.

With the aforementioned electric storage element, the other protective tape that covers the negative-electrode terminal from the direction opposite the protective tape may further be provided, and the other protective tape may have lower ion permeability than that of the separator.

This means that, because the negative-electrode terminal is covered by the other protective tape from the direction opposite the protective tape, deposition of metal lithium onto the negative-electrode terminal is suppressed further.

With the aforementioned electric storage element, the negative electrode may further have, in a part facing the other protective tape via the separator and positive electrode, a fourth region where absorption of lithium ions can be suppressed, and the negative-electrode terminal may be positioned between the third region and the fourth region.

This means that, because the negative electrode has, in the part facing the other protective tape via the separator and positive electrode, the fourth region where absorption of lithium ions can be suppressed, metal lithium no longer deposits easily onto parts of the negative electrode other than where the negative-electrode terminal is attached, and consequently lithium ions are absorbed more uniformly across the entire negative electrode during charge.

As described above, according to the present invention an electric storage element offering improved reliability because its negative electrode absorbs lithium ions more uniformly, is provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

100—Electrochemical device
110A, 110B, 110C, 110D, 110E, 510—Electric storage element
111—Winding structure
112—Winding core
113—Center axis of winding
120—Housing
130—Negative electrode
131—Negative-electrode terminal
132—Negative-electrode collector
132a, 132b—Principal face
133, 133a, 133b—Negative-electrode active material layer
135—Third region
136—Fourth region
140—Positive electrode
141—Positive-electrode terminal
142—Positive-electrode-collector
142a, 142b—Principal face
143, 143a, 143b—Positive-electrode active material layer
145—First region
145w—Width
146—Second region
146w—Width
150, 150a, 150b—Separator
161, 162, 163, 164, 165—Protective tape
161w, 163w—Width
180—Lithium electrode
181a, 181b—Principal face
181—Metal foil
183—Metal lithium layer

DETAILED DESCRIPTION OF EMBODIMENTS

Embodiments of the present invention are explained below by referring to the drawings. It should be noted that some drawings show a triaxial reference system (an XYZ-axis coordinate system) for illustrative purposes.

First Embodiment

[Overview of Electrochemical Device]

An overview of an electrochemical device 100 pertaining to this embodiment is explained below. The electrochemical device illustrated in this embodiment is a lithium ion capacitor. Details of an electric storage element 110A contained in the electrochemical device 100 are described later.

Figure 1:
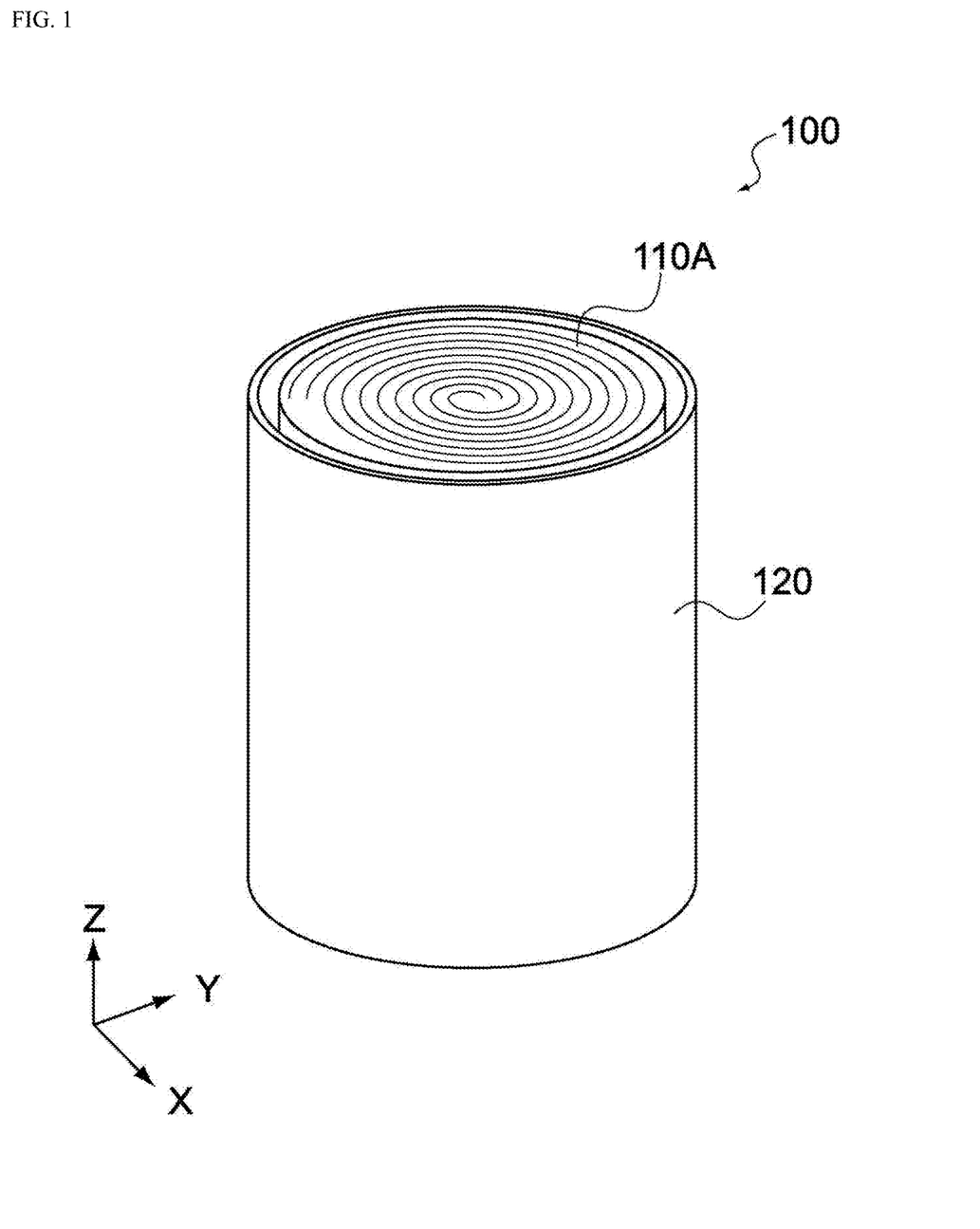
FIG. 1 is a schematic perspective view showing the appearance of the electrochemical device 100 pertaining to the first embodiment.

FIG. 1 is a schematic perspective view showing the appearance of the electrochemical device 100 pertaining to the first embodiment. The electrochemical device 100 shown in FIG. 1 is such that its electric storage element 110A is housed in a housing 120. Along with the electric storage element 110A, an electrolyte is filled in the housing 120. The electric storage element 110A is immersed in the electrolyte. A lid (not illustrated) is provided on the electric storage element 110A, and the electrolyte is sealed by the housing 120 and the lid.

In the electrochemical device 100 whose electric storage element 110A is immersed in the electrolyte, lithium ion pre-doping has already been completed. The electric storage element 110A, before it is immersed in the electrolyte, has a lithium ion supply source. Once the electric storage element 110A is immersed in the electrolyte, lithium ions elute from the lithium ion supply source into the electrolyte, and these lithium ions are doped into the negative electrode of the electric storage element 110A.

[Constitution of Electric Storage Element]

Figure 2:
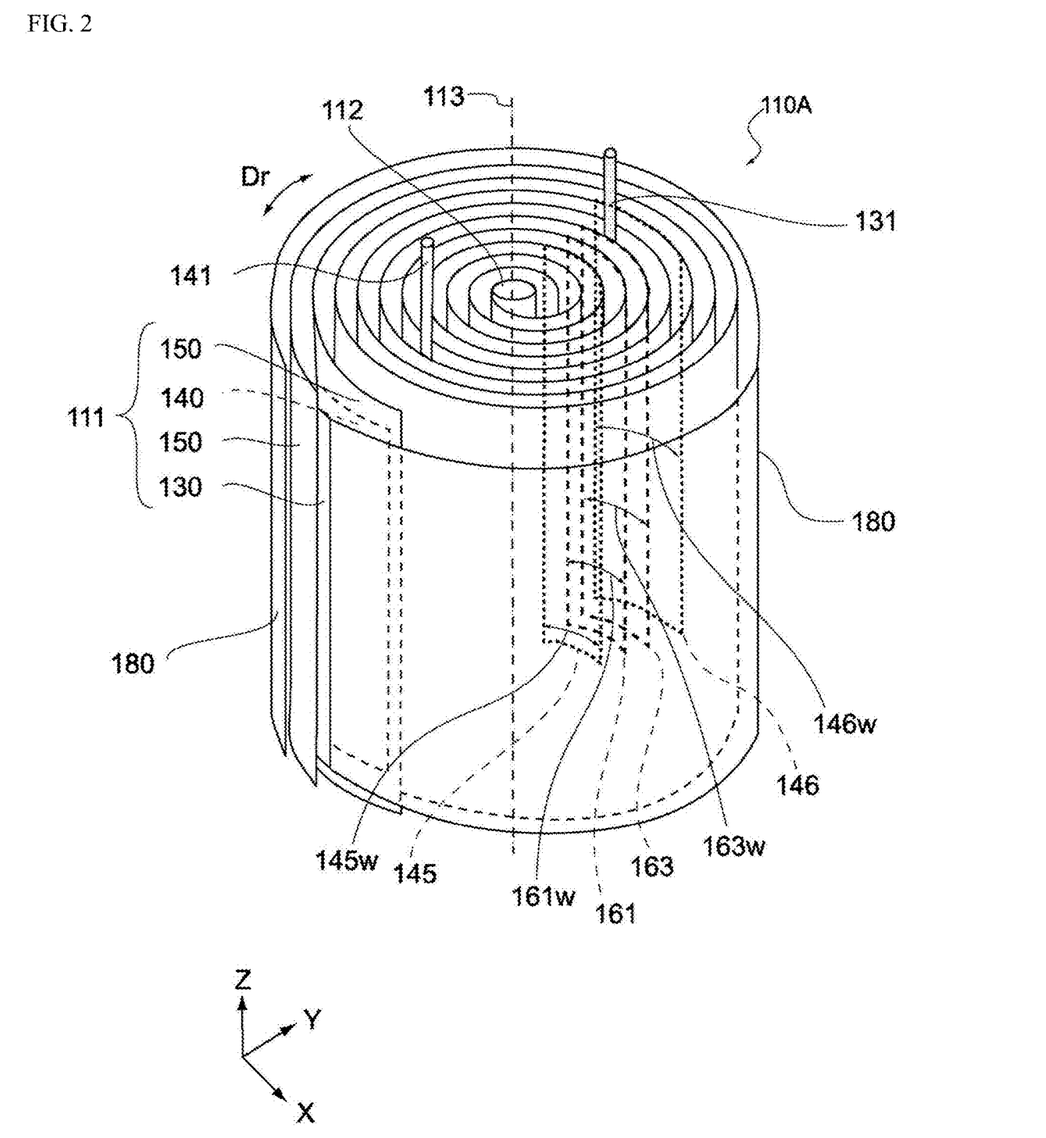
FIG. 2 is a schematic perspective view showing the electric storage element 110A pertaining to the first embodiment.

FIG. 2 is a schematic perspective view showing the electric storage element 110A pertaining to the first embodiment.

As shown in FIG. 2, the electric storage element 110A comprises a negative electrode 130, a positive electrode 140, a negative-electrode terminal 131, a positive-electrode terminal 141, a winding core 112, a separator 150, and a lithium electrode 180. The electric storage element 110A illustrated in FIG. 2 is an electric storage element before pre-doping. The negative electrode 130 is an electrode capable of occluding and releasing lithium ions. The positive electrode 140 is a polarizable electrode. With such electric storage element, desirably lithium ions are more uniformly doped into the negative electrode after pre-doping.

In this embodiment, the direction in which the winding core 112 extends is defined as the Z-axis direction. The X-axis direction is a direction orthogonal to the Z-axis direction. The Y-axis direction is a direction orthogonal to the X-axis direction and Z-axis direction. The direction in which the winding core 112 extends (direction parallel with the center axis of winding) is also the direction in which the negative-electrode terminal 131 and positive-electrode terminal 141 extend. Also, with respect to the electric storage element 110A, the direction from the center axis of winding 113 toward the outer periphery of the electric storage element 110A is defined as the outer direction, while the opposite direction is defined as the inner direction. This embodiment also includes structures where the electric storage element 110A has no winding core 112.

The negative electrode 130, positive electrode 140, and separator 150 are stacked toward the outer side from the winding core 112. The separator 150 is placed between the negative electrode 130 and the positive electrode 140. The positive electrode 140 and the negative electrode 130 are separated by the separator 150. The separator 150 insulates the negative electrode 130 and the positive electrode 140. The negative electrode 130, positive electrode 140, and separator 150 are wound around the winding core 112. In this embodiment, the structure that includes the negative electrode 130, positive electrode 140, and separator 150 is defined as the winding structure 111. Also, the direction in which the negative electrode 130, positive electrode 140, and separator 150 are wound around the center axis of winding 113 is defined as the winding direction Dr.

The negative-electrode terminal 131 is electrically connected to the negative electrode 130. The negative-electrode terminal 131 extends through the winding structure 111 along the center axis of winding 113 of the winding structure 111. The negative-electrode terminal 131 projects from the winding structure 111. The positive-electrode terminal 141 is electrically connected to the positive electrode 140. The positive-electrode terminal 141 extends through the winding structure 111 along the center axis of winding 113. The positive-electrode terminal 141 projects from the winding structure 111. In the example in FIG. 2, the positive-electrode terminal 141 projects from the winding structure 111 in the same direction as the negative-electrode terminal 131.

A protective tape 161 (first protective tape) covers the negative-electrode terminal 131. Also, the negative-electrode terminal 131 is covered by a protective tape 163 (third protective tape) from the side opposite the protective tape 161. The protective tape 163 faces the protective tape 161. The protective tape 161 is positioned between the protective tape 163 and the center axis of winding 113. The protective tape 161 has a width 161w in the winding direction Dr. The protective tape 163 has a width 163w in the winding direction Dr. The width 163w of the protective tape 163 is the same as the width 161w of the protective tape 161, for example. The ion permeation rates of the protective tapes 161, 163 are lower than the ion permeation rate of the separator 150. For example, the protective tapes 161, 163 are resin films that are substantially impermeable to ions.

The lithium electrode 180 is electrically connected to the negative electrode 130. The lithium electrode 180 is placed on the outer side of the negative-electrode terminal 131 and positive-electrode terminal 141. In the example in FIG. 2, the winding structure 111 is surrounded by the lithium electrode 180. The lithium electrode 180 has a metal foil and a metal lithium layer, for example. The metal lithium layer is provided on the inner side of the metal foil. Although the lithium electrode 180 is exposed in the example in FIG. 2, the lithium electrode 180 may be surrounded by the separator 150.

In the electric storage element 110A, the positive electrode 140 has, in a part facing the protective tape 161 via the separator 150, a first region 145 where release of lithium ions can be suppressed. In the winding direction Dr, a width 145w of the first region 145 is equal to or smaller than the width 161w of the protective tape 161.

Furthermore, in the electric storage element 110A, the positive electrode 140 may also have, in a part facing the protective tape 163 via the separator 150, a second region 146 where release of lithium ions can be suppressed. In the winding direction Dr, a width 146w of the second region 146 is equal to or greater than the width 163w of the protective tape 163. The negative-electrode terminal 131 is positioned between the first region 145 and the second region 146.

The structure of the electric storage element 110A is explained in greater detail.

Figure 3:
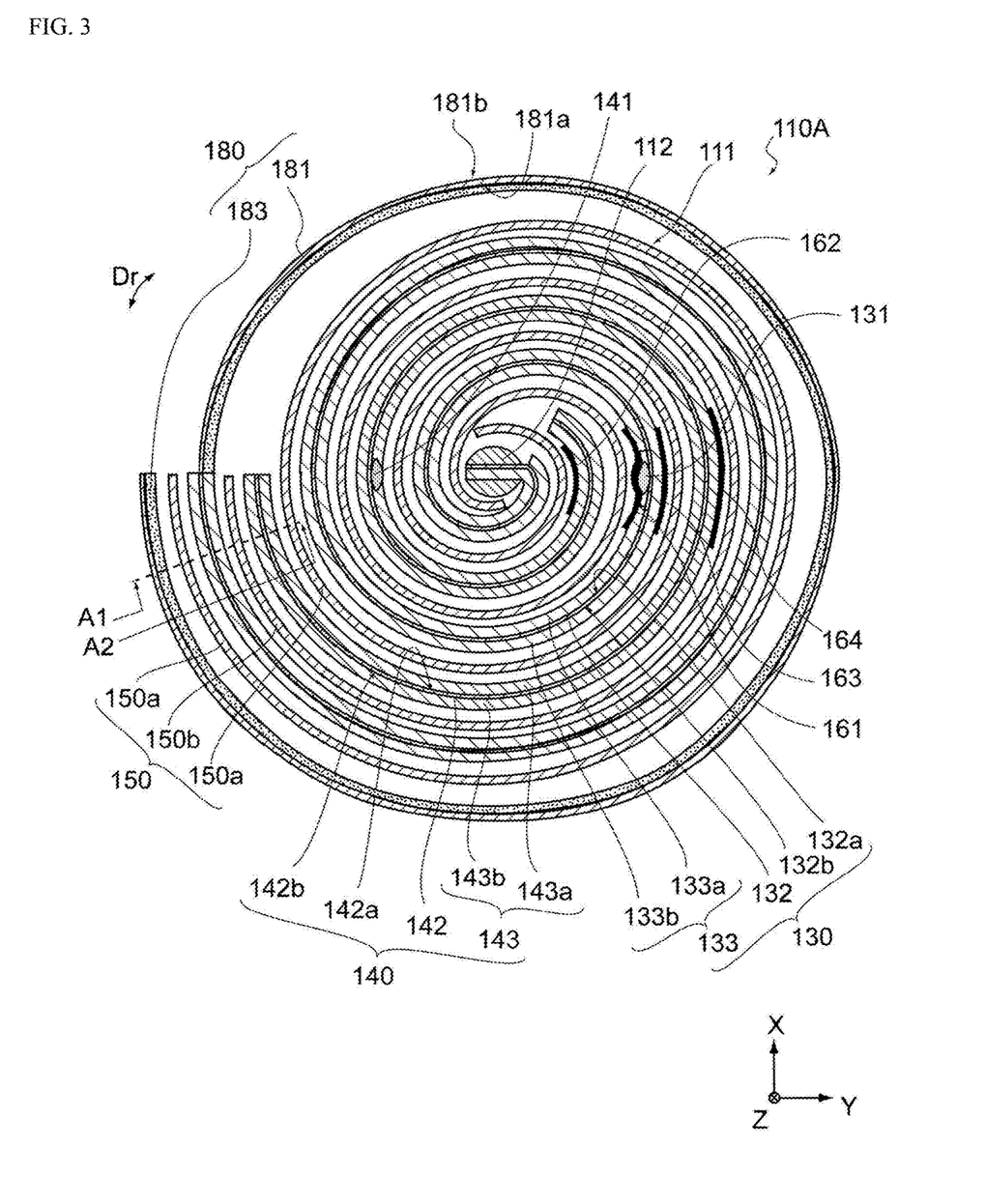
FIG. 3 is a schematic cross-sectional view, along the X-Y plane, of the electric storage element 110A pertaining to the first embodiment.
Figure 4A:
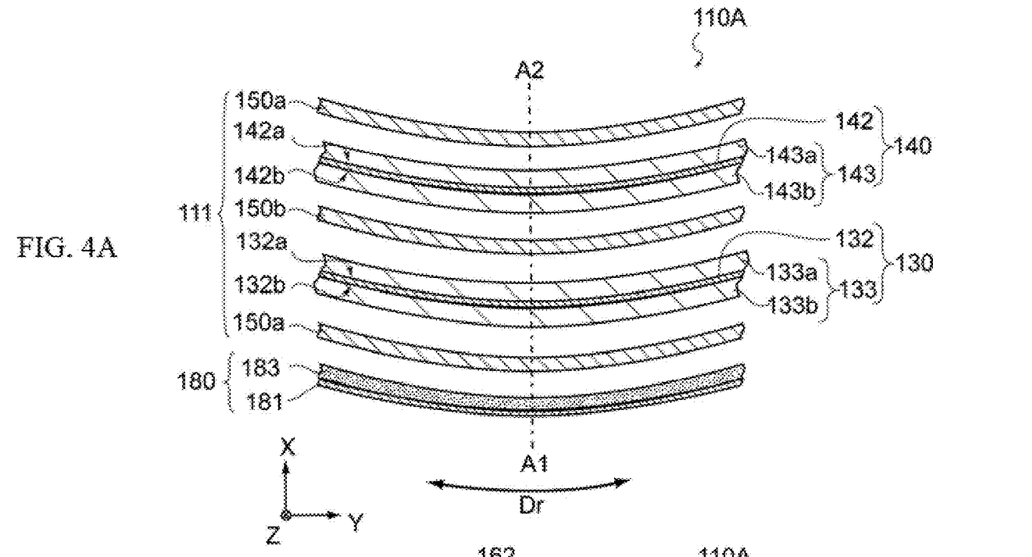
FIG. 4A is a schematic cross-sectional view, along the X-Y plane, of the vicinity of line A1-A2 in FIG. 3.
Figure 4B:
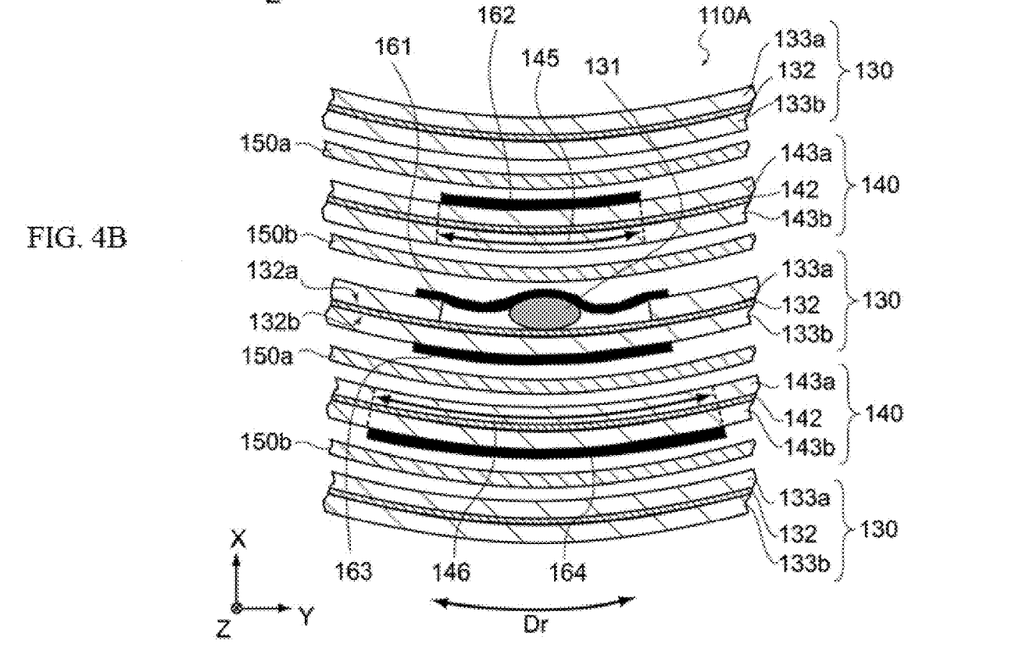
FIG. 4B is a schematic cross-sectional view, along the X-Y plane, of the vicinity of the negative-electrode terminal 131 in FIG. 3.

FIG. 3 is a schematic cross-sectional view, along the X-Y plane, of the electric storage element 110A in the first embodiment. FIG. 4A is a schematic cross-sectional view, along the X-Y plane, of the vicinity of line A1-A2 in FIG. 3. FIG. 4B is a schematic cross-sectional view, along the X-Y plane, of the vicinity of the negative-electrode terminal 131 in FIG. 3.

In the electric storage element 110A, the negative electrode 130 has a negative-electrode collector 132 and a negative-electrode active material layer 133. The negative-electrode active material layer 133 has a negative-electrode active material layer 133a provided on a principal face 132a (inner principal face) of the negative-electrode collector 132, and a negative-electrode active material layer 133b provided on a principal face 132b (outer principal face) of the negative-electrode collector 132. In this embodiment, the negative-electrode active material layer 133a may be referred to as "inner negative-electrode active material layer," while the negative-electrode active material layer 133b may be referred to as "outer negative-electrode active material layer." The negative-electrode terminal 131 is electrically connected to the negative-electrode collector 132. For example, the negative-electrode active material layer 133a is not provided in a part of the principal face 132a of the negative-electrode collector 132, and the negative-electrode terminal 131 is connected to the negative-electrode collector 132 in this part where the negative-electrode active material layer 133a is not provided.

In the electric storage element 110A, the negative-electrode terminal 131, the exposed part of the negative-electrode collector 132, and the negative-electrode active material layer 133 in the vicinity of the negative-electrode terminal 131, are covered by the protective tape 161.

The protective tape 161 faces the winding core 112 via the negative electrode 130, positive electrode 140, and separator 150. If the negative-electrode terminal 131 is not covered by the protective tape 161 at the time of pre-doping, metal lithium may deposit preferentially onto the negative-electrode terminal 131. For this reason, the negative-electrode terminal 131 is covered by the protective tape 161 so that it is insulated from the electrolyte.

Also, the negative-electrode terminal 131 is covered by the other protective tape 163 from the side opposite the protective tape 161. The protective tape 163 faces the protective tape 161 via the negative-electrode terminal 131 and negative-electrode collector 132. If the negative-electrode terminal 131 is connected to the negative-electrode collector 132 by means of needle caulking, for example, the machined part of negative-electrode terminal pierces through the negative-electrode collector 132 and the negative-electrode active material layer 133b provided on the outer side of the negative-electrode collector 132. Covering this piercing-machined part of negative-electrode terminal, by the protective tape 163, suppresses deposition of metal lithium onto the piercing machined part of negative-electrode terminal. Furthermore, the protective tapes 161, 163 also function as buffer materials to prevent the negative-electrode terminal 131, and the machined part of negative-electrode terminal, from directly contacting the adjacent negative-electrode active material layer 133.

Also, in the electric storage element 110A, the positive electrode 140 has a positive-electrode collector 142 and a positive-electrode active material layer 143. The positive-electrode active material layer 143 has a positive-electrode active material layer 143a provided on a principal face 142a (inner principal face) of the positive-electrode collector 142, and a positive-electrode active material layer 143b provided on a principal face 142b (outer principal face) of the positive-electrode collector 142. In this embodiment, the positive-electrode active material layer 143a may be referred to as "inner positive-electrode active material layer," while the positive-electrode active material layer 143b may be referred to as "outer positive-electrode active material layer." The positive-electrode terminal 141 is electrically connected to the positive-electrode collector 142. For example, the positive-electrode active material layer 143a is not provided in a part of the principal face 142a of the positive-electrode collector 142, and the positive-electrode terminal 141 is connected to the positive-electrode collector 142 in this part where the positive-electrode active material layer 143a is not provided. The positive-electrode terminal 141, the positive-electrode active material layer 143 in the vicinity of the positive-electrode terminal 141, and the machined part of positive-electrode terminal that connects the positive-electrode terminal 141 to the positive-electrode collector 142, may be covered by a protective tape.

The positive electrode 140 has a first region 145 where release of lithium ions can be suppressed. The first region 145 has a protective tape 162 (second protective tape), and parts of the positive-electrode active material layer 143 and positive-electrode collector 142 covered by the protective tape 162. For example, the positive-electrode active material layer 143a is covered by the protective tape 162 in the first region 145. The protective tape 162 faces the negative electrode 130 (negative-electrode active material layer 133b) via the separator 150. The ion permeation rate of the protective tape 162 is lower than the ion permeation rate of the separator 150. For example, the protective tape 162 is a resin film that is substantially impermeable to ions.

In addition, the positive electrode 140 further has a second region 146 where release of lithium ions can be suppressed, separate from the first region 145. The second region 146 has a protective tape 164 (fourth protective tape), and parts of the positive-electrode active material layer 143b and positive-electrode collector 142 covered by the protective tape 164. For example, the positive-electrode active material layer 143b is covered by the protective tape 164 in the second region 146. The ion permeation rate of the protective tape 164 is lower than the ion permeation rate of the separator 150. For example, the protective tape 164 is a resin film that is substantially impermeable to ions.

In the above, the protective tapes 161, 163 are positioned between the first region 145 and the second region 146.

The separator 150 has a separator 150a and a separator 150b. The separators 150a, 150b insulate the negative electrode 130 and the positive electrode 140. The separators 150a, 150b separate the negative electrode 130 and the positive electrode 140, while allowing the ions contained in the electrolyte to permeate through. In this embodiment, the separators 150a, 150b are collectively referred to as "separator 150." Also, the separators 150a, 150b may be one continuous separator.

The lithium electrode 180 is placed on the outer side of the negative-electrode terminal 131 and positive-electrode terminal 141. The lithium electrode 180 has a metal foil 181 and a metal lithium layer 183. In the example in FIG. 3, the electrode on the outermost side of winding (outermost periphery) of the winding structure 111 becomes the negative electrode 130, and the lithium electrode 180 is connected to the negative-electrode collector 132 on this outermost side of winding. The lithium electrode 180 is placed in a manner surrounding the winding structure 111, for example. The metal foil 181 is a copper foil, for example. The metal lithium layer 183 is selectively provided on the metal foil 181. The metal lithium layer 183 is a metal lithium foil, for example. The quantity of the metal lithium layer 183 is adjusted to a level dopable into the negative-electrode active material layer 133 during lithium ion pre-doping.

The metal foil 181 is electrically connected to the negative-electrode collector 132. The metal foil 181 is joined to the negative-electrode collector 132 by means of needle caulking, welding, etc., for example. The metal foil 181 is placed on the outer side of the winding structure 111 in a manner going around the winding structure 111 once. With the metal foil 181, a principal face 181a represents the face on the inner side of winding, while a principal face 181b represents the face on the outer side of winding. The width of the metal foil 181 in the Z-axis direction is the same as the width of the negative-electrode collector 132 in the Z-axis direction, for example.

The metal lithium layer 183 functions as a lithium ion supply source when lithium ions are pre-doped into the negative-electrode active material layer 133. For this reason, preferably the metal lithium layer 183 is provided on the principal face 181a on the inner side of winding, rather than on the principal face 181b on the outer side of winding. This way, at the time of pre-doping, lithium ions diffuse into the winding structure 111 from the principal face 181a of the metal foil 181, through the electrolyte, without being blocked by the metal foil 181. It should be noted that, if the metal lithium layer 183 is provided on the principal face 181b, then multiple through holes may be formed in the metal foil 181 to allow lithium ions to penetrate through the metal foil 181.

The separator 150a is placed between the lithium electrode 180 and the positive electrode 140. This way, the lithium electrode 180 is insulated from the positive electrode 140. Also, in this embodiment, the lithium electrode 180 need not be placed in a manner surrounding the winding structure 111. For example, the lithium electrode 180 may be placed inside the winding structure 111, so long as it is on the outer side of the negative-electrode terminal 131 and positive-electrode terminal 141. It should be noted, however, that the lithium electrode 180 is electrically connected to the negative electrode 130.

In the Z-axis direction, the width of the positive electrode 140 is 24 mm, the width of the negative electrode 130 is 27 mm, and the width of the separator 150 is 30 mm. Also, the diameter of the winding structure 111 is 11 mm, while its length in the Z-axis direction is 30 mm. The distance between the positive-electrode terminal 141 and the negative-electrode terminal 131 is 5 mm. The width 161w of the protective tape 161 and width 163w of the protective tape 163 are both 10 mm, while the Z-axis direction lengths of the protective tapes 161, 163 are both 20 mm. It should be noted, however, that these dimensions are only examples and dimensions are not limited to the aforementioned values.

The materials of the electric storage element 110A are explained.

For the material of the negative-electrode terminal 131, copper, iron or stainless steel may be used. The positive-electrode terminal 141 contains at least one of aluminum, titanium, etc. The negative-electrode terminal 131 is a copper terminal, for example. The positive-electrode terminal 141 is an aluminum terminal, for example.

The negative-electrode collector 132 is a metal foil, for example. Multiple through holes may be provided in the metal foil. The negative-electrode collector 132 may also be a copper foil, etc., for example. The negative electrode active material contained in the negative-electrode active material layer 133 is a material capable of occluding and releasing the lithium ions in the electrolyte, and may be non-graphitizable carbon (hard carbon), graphite, soft carbon, or other carbon material. The negative-electrode active material layer 133 may be a mixture of negative electrode active material and binder resin, which may further contain a conductive auxiliary agent. For example, the negative-electrode active material layer 133 is produced by forming a sheet form using a slurry mixture of any of the aforementioned active materials with conductive auxiliary agent and synthetic resin, and then cutting the sheet.

For the binder resin, any synthetic resin that joins the negative electrode active material is sufficient. For the binder resin, carboxy methyl cellulose, styrene butadiene rubber, polyethylene, polypropylene, aromatic polyamide, fluororubber, polyvinylidene fluoride, isoprene rubber, butadiene rubber, ethylene propylene rubber, etc., may be used, for example.

For the conductive auxiliary agent which is constituted by grains made of conducive material, a material that can improve the conductivity within the negative electrode active material is sufficient. The conductive auxiliary agent may be graphite, carbon black, or other carbon material, for example. Any of the foregoing materials may be used alone, or multiple types of materials may be mixed together. It should be noted that the conductive auxiliary agent may be a metal material or conductive polymer, so long as the material has conductivity.

The material of the positive-electrode collector 142 is aluminum, etc., for example. The positive electrode active material contained in the positive-electrode active material layer 143 contains at least one of active materials such as active carbon, PAS (polyacenic semiconductor), etc. The positive-electrode active material layer 143 is produced by forming a sheet form using a slurry mixture of any of the aforementioned active materials with conductive auxiliary agent (such as carbon black) and synthetic resin (such as PTFE, etc.), and then cutting the sheet.

The separator 150 may be a sheet material that lets ions permeate through, while insulating the negative electrode 130 and the positive electrode 140. The separator 150 may be a woven fabric, nonwoven fabric, microporous synthetic resin membrane, etc. The separator 150 may also be a porous sheet made of glass fiber, cellulose fiber, plastic fiber, etc.

For the electrolyte, any electrolyte can be selected. For example, such electrolyte contains at least lithium ions as cations. As anions, it may contain $BF_4^-$ (boron tetrafluoride ions), $PF_6^-$ (phosphorus hexafluoride ions), $(CF_3SO_2)_2N^-$ (TFSA ions), or other anions, and as a solvent, it may contain propylene carbonate, ethylene carbonate, dimethyl carbonate, ethyl methyl carbonate, dimethyl carbonate, sulfolane, dimethyl sulfone, ethyl methyl sulfone, ethyl isopropyl sulfone, etc. To be specific, a propylene carbonate solution of lithium tetrafluoroborate ($LiBF_4$) or lithium hexafluorophosphate ($LiPF_6$), etc., may be used.

For the protective tapes 161, 162, 163, 164, materials resistant to heat and the electrolyte are applied. For example, the protective tapes 161, 162, 163, 164 may contain any of polyimide, polypropylene, polyphenylene sulfide, etc.

[Operation of Electric Storage Element]

Figure 5A:
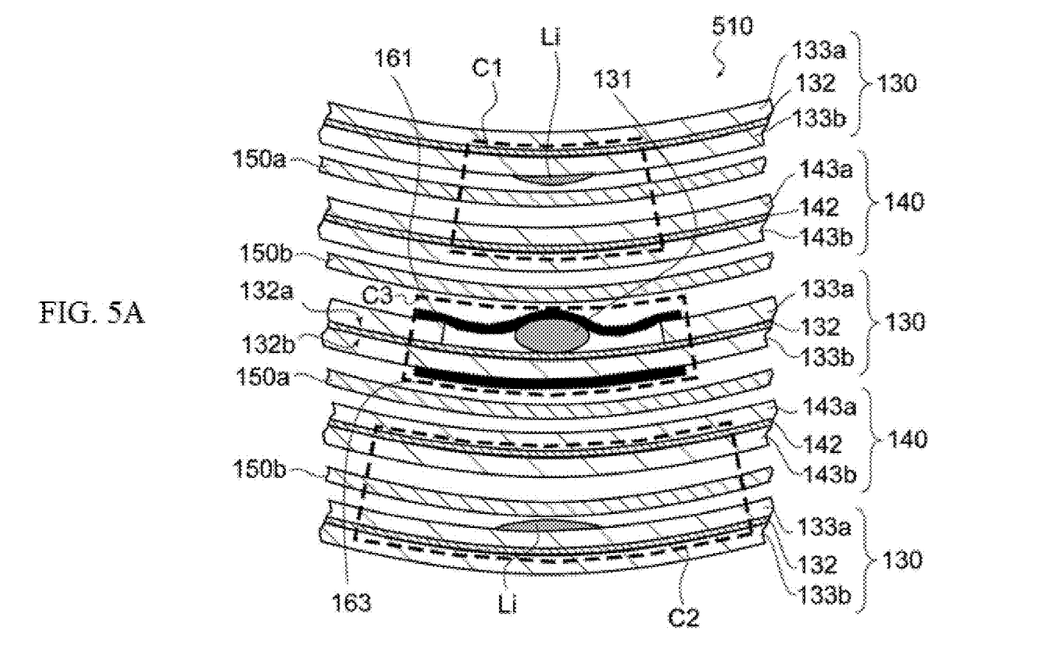
FIG. 5A is a schematic cross-sectional view showing the operation of the electric storage element 510 pertaining to a comparative example.
Figure 5B:
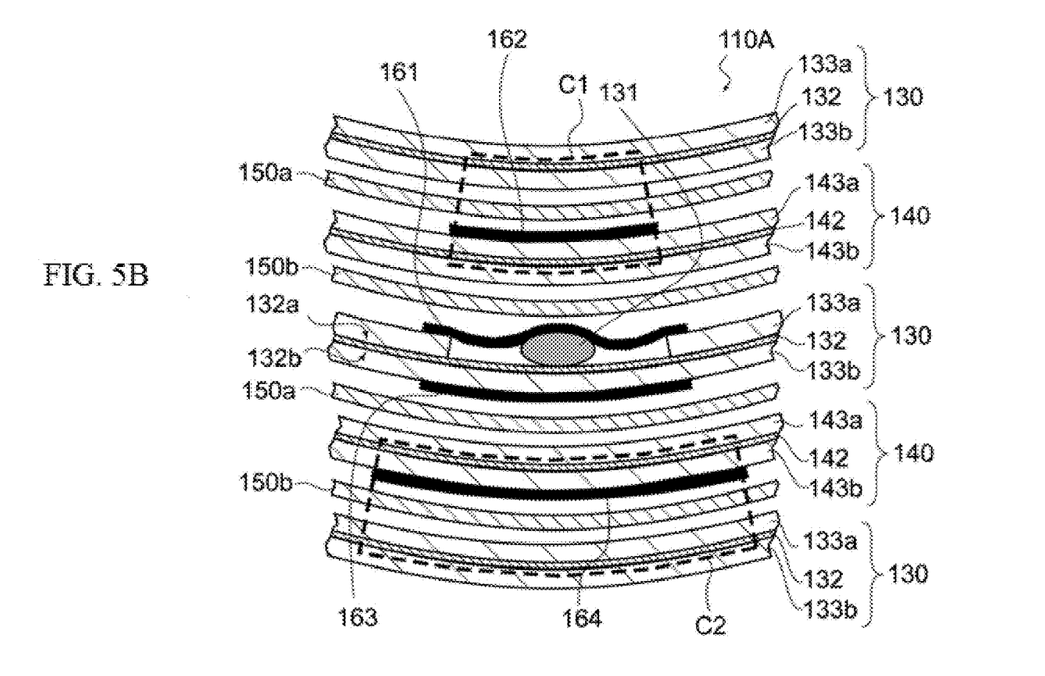
FIG. 5B is a schematic cross-sectional view showing the operation of the electric storage element 110A pertaining to the first embodiment.

FIG. 5A is a schematic cross-sectional view showing the operation of an electric storage element 510 pertaining to a comparative example. FIG. 5B is a schematic cross-sectional view showing the operation of the electric storage element 110A pertaining to the first embodiment.

Before the operation of the electric storage element 110A pertaining to this embodiment is explained, the operation of the electric storage element 510 pertaining to the comparative example, as shown in FIG. 5A, is explained. The electric storage element 510 pertaining to the comparative example has neither the first region 145 nor the second region 146.

Once pre-doped, the electric storage element 510 stores electricity during charge as lithium ions are released from the positive electrode 140 and these lithium ions are doped into the negative electrode 130.

Now, if a part of the negative electrode 130 in the vicinity of the negative-electrode terminal 131 (the part of the negative electrode 130 denoted by the box C3) is covered by the protective tapes 161, 163, then this part of the negative electrode 130 denoted by the box C3 no longer absorbs lithium ions easily during charge. Because of this, during charge the parts of the negative electrode 130 facing, via the positive electrode 140, the part of the negative electrode 130 denoted by the box C3 (the negative-electrode active material layer 133b inside the box C1 and the negative-electrode active material layer 133a inside the box C2) take over the function of the part of the negative electrode 130 denoted by the box C3. As a result, during charge lithium ions tend to be taken up preferentially by the parts of the negative electrode 130 denoted by the boxes C1, C2, rather than the parts of the negative electrode 130 other than those denoted by the boxes C1, C2. This means that, especially when the charge speed increases, metal lithium (Li) may deposit locally in the parts of the negative electrode 130 denoted by the boxes C1, C2. Note that the broken lines forming the boxes C1, C2 (also C3 discussed below) do not represent any elements of the winding structure but only schematically define the corresponding regions described herein for illustrative purposes. The ends of each region along the winding direction (i.e., the width) may be defined by two lines (not shown) roughly or substantially radiating from the center axis which define the ends of the protective tape along the winding direction (i.e., the width) as viewed from the direction of the center axis.

If this phenomenon is repeated, metal lithium (Li) deposits locally in the parts of the negative electrode 130 denoted by the boxes C1, C2. And, if metal lithium continues to grow in these parts, the metal lithium may pierce through the separator 150 and contact the positive electrode 140 facing it. In this case, the negative electrode 130 shorts with the positive electrode 140.

By contrast, the electric storage element 110A pertaining to this embodiment solves the aforementioned problem. For example, the electric storage element 110A pertaining to this embodiment, as shown in FIG. 5B, has the first region 145 (protective tape 162) in the part of the positive electrode 140 denoted by the box C1 (positive-electrode active material layer 143a), and the second region 146 (protective tape 164)

in the part of the positive electrode 140 denoted by the box C2 (positive-electrode active material layer 143b).

This means that, even when charge load is applied to the parts of the negative electrode 130 other than the part denoted by the box C3 (parts of the negative electrode 130 denoted by the boxes C1, C2) during charge, the presence of the protective tapes 162, 164 makes it difficult for lithium ions to move between the parts of the negative electrode 130 denoted by the boxes C1, C2 and the positive electrode 140. This makes it difficult for metal lithium to deposit easily onto the parts of the negative electrode 130 denoted by the boxes C1, C2. In the electric storage element 110A, therefore, local deposition (build-up) of metal lithium onto the negative electrode 130 is suppressed, even when the charge speed increases, and lithium ions are absorbed more uniformly across the entire negative electrode 130 as a result. This increases the reliability of the electric storage element 110A.

Also, charging/discharging of the electric storage element 110A causes lithium ions to move radially, and in the opposite direction, between the negative electrode 130 and the positive electrode 140. Here, the movement of lithium ions is blocked by the first region 145 and second region 146 in the winding structure 111, if the width 145w of the first region 145 is greater than the width 161w of the protective tape 161 and the width 146w of the second region 146 is smaller than the width 163w of the protective tape 163.

In the electric storage element 110A, the first region 145 is constituted so that its width 145w is equal to or smaller than the width 161w of the protective tape 161, while the second region 146 is constituted so that its width 146w is equal to or greater than the width 163w of the protective tape 163. This makes it difficult for the lithium ions to be blocked by the first region 145 and second region 146 between the negative electrode 130 and the positive electrode 140 during charge/discharge, and consequently the lithium ions diffuse more uniformly between the negative electrode 130 and the positive electrode 140.

For example, when multiple electric storage elements 110A and multiple electric storage elements 510 were prepared and these multiple electric storage elements 110A and multiple electric storage elements 510 were put through a 10,000-cycle test at a charge/discharge current equivalent to 100 C, no abnormality was observed. When they were put through a 10,000-cycle test at a charge/discharge current equivalent to 200 C, however, approx. 80% of the multiple electric storage elements 510 had a lower voltage after the test.

Second Embodiment

Figure 6:
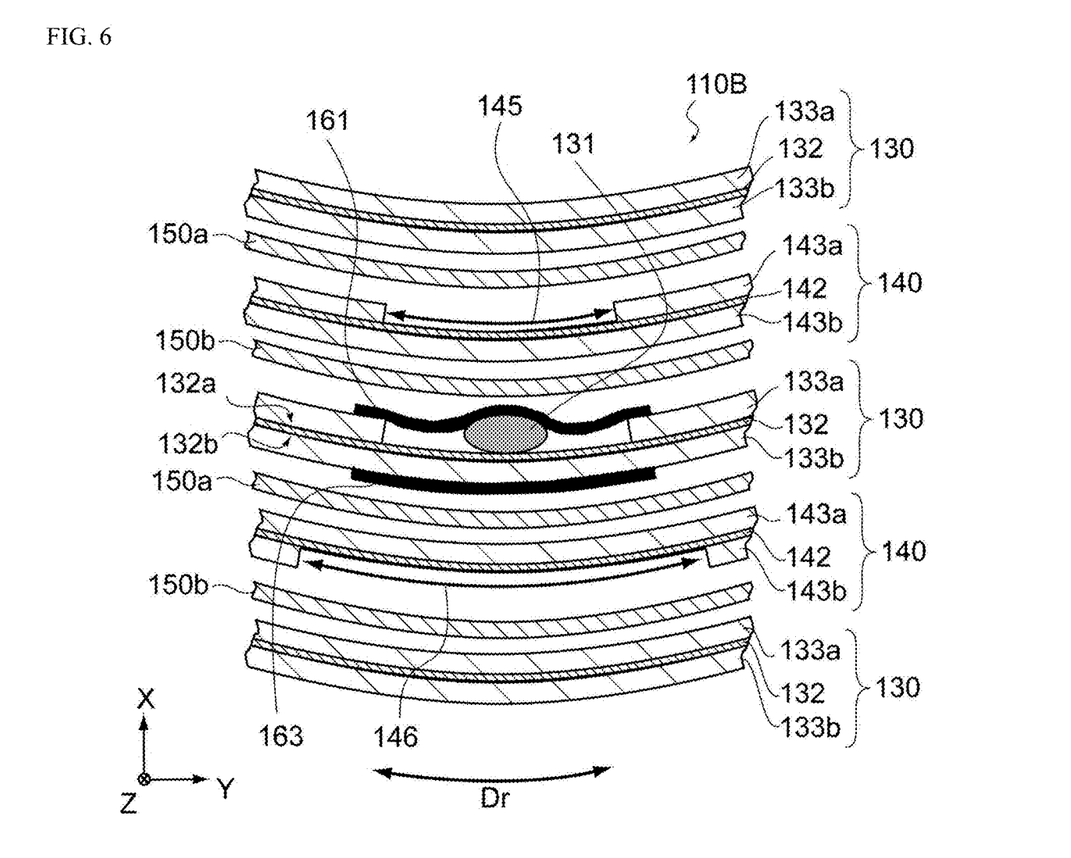
FIG. 6 is a schematic cross-sectional view, along the X-Y plane, of the electric storage element 110B pertaining to the second embodiment.

FIG. 6 is a schematic cross-sectional view, along the X-Y plane, of an electric storage element 110B pertaining to the second embodiment. FIG. 6 shows a schematic cross-sectional, along the X-Y plane, of the vicinity of the negative-electrode terminal 131 of the electric storage element 110B.

In the electric storage element 110B, the thickness of the positive-electrode active material layer 143a in the first region 145 is smaller than the thickness of the positive-electrode active material layers 143a, 143b outside the first region 145, or the positive-electrode active material layer 143a is not provided in the first region 145. Also, in the electric storage element 110B, the thickness of the positive-electrode active material layer 143b in the second region 146 is smaller than the thickness of the positive-electrode active material layers 143a, 143b outside the first region 145 and second region 146, or the positive-electrode active material layer 143b is not provided in the second region 146. In the example shown in FIG. 6, the positive-electrode active material layer 143a is not provided in the first region 145, and the principal face 142a of the positive-electrode collector 142 is exposed. Also, in the example shown in FIG. 6, the positive-electrode active material layer 143b is not provided in the second region 146, and the principal face 142b of the positive-electrode collector 142 is exposed.

The first region 145 without the positive-electrode active material layer 143a is formed by, for example, a method to selectively remove the positive-electrode active material layer 143a from the positive-electrode collector 142 in the first region 145, or a method to form a masking member on the positive-electrode collector 142 over the first region 145 and mask the first region 145 from the positive-electrode active material layer 143a. The second region 146 is formed by the same methods used for the first region 145.

Such constitution also suppresses release of lithium ions in the first region 145 or in the second region 146. This way, local build-up of metal lithium onto the negative electrode 130 is suppressed and lithium ions are absorbed more uniformly across the entire negative electrode 130.

Third Embodiment

Figure 7:
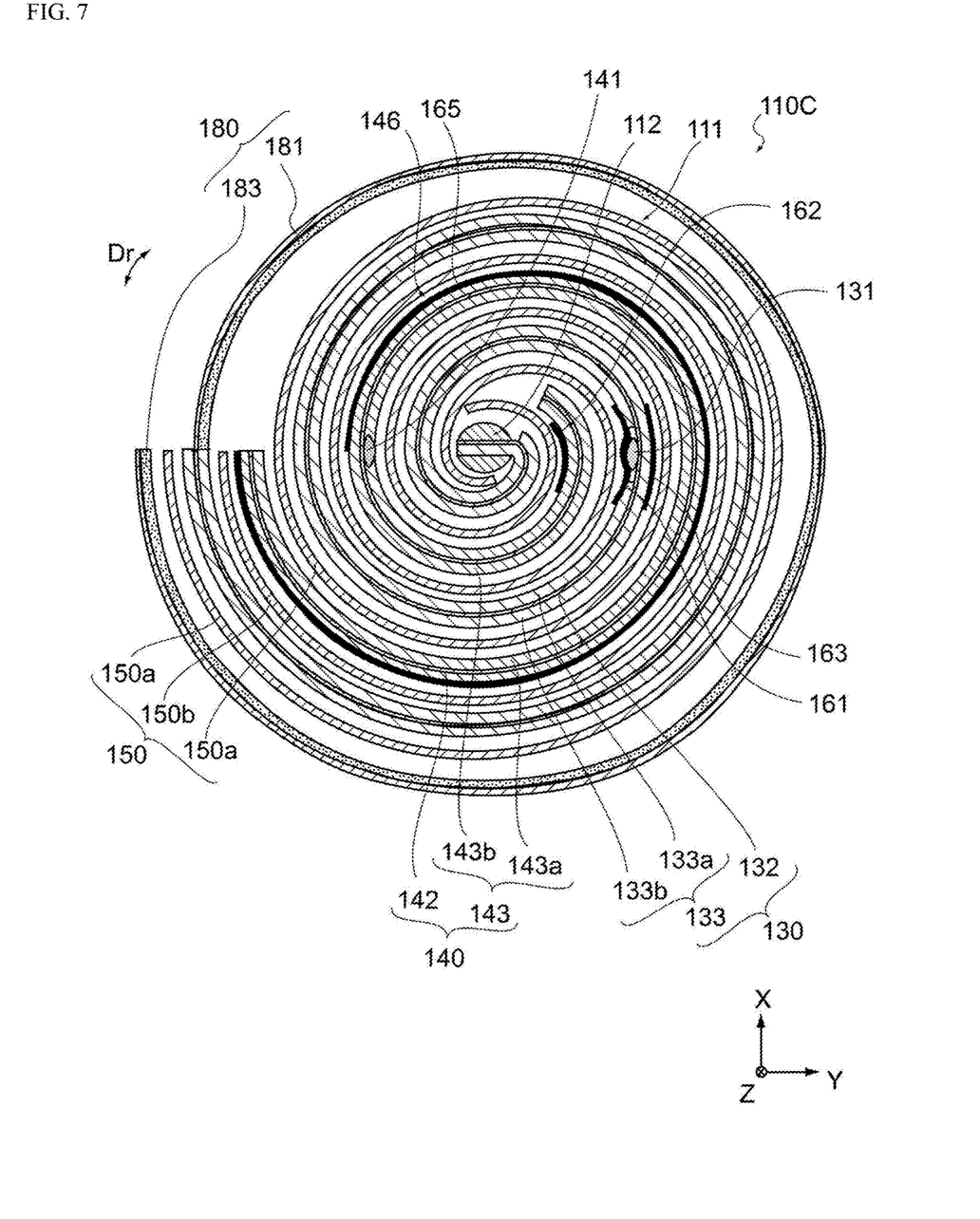
FIG. 7 is a schematic cross-sectional view, along the X-Y plane, of the electric storage element 110C pertaining to the third embodiment.

FIG. 7 is a schematic cross-sectional view, along the X-Y plane, of an electric storage element 110C pertaining to the third embodiment.

In the electric storage element 110C, the second region 146 of the positive electrode 140 continues and goes around the structure at least once in the winding direction Dr. In the electric storage element 110C, for example, a protective tape 165 which covers the positive-electrode active material layer 143b in the second region 146 is wound at least once around the structure. The material of the protective tape 165 is the same as the material of the protective tape 164.

Such constitution also suppresses release of lithium ions in the first region 145 or in the second region 146. In particular, release of lithium ions in the second region 146 is suppressed further. This way, local deposition of metal lithium onto the negative electrode 130 is suppressed and lithium ions are absorbed more uniformly across the entire negative electrode 130.

Fourth Embodiment

Figure 8:
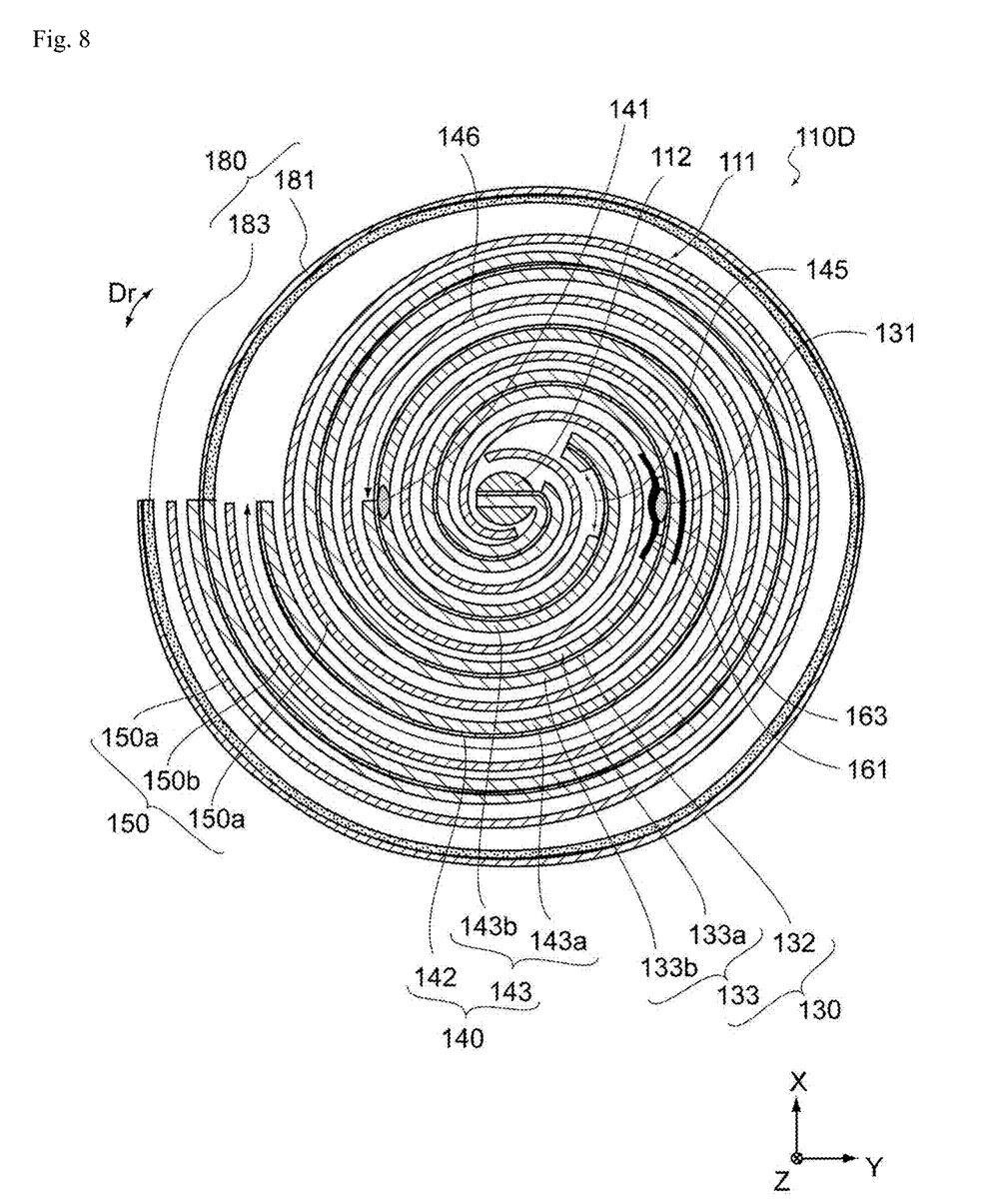
FIG. 8 is a schematic cross-sectional view, along the X-Y plane, of the electric storage element 110D pertaining to the fourth embodiment.

FIG. 8 is a schematic cross-sectional view, along the X-Y plane, of an electric storage element 110D pertaining to the fourth embodiment.

In the electric storage element 110D, the second region 146 of the positive electrode 140 continues and goes around the structure at least once in the winding direction Dr. In the electric storage element 110D, for example, no positive-electrode active material layer 143b is provided in the second region 146 and goes around the structure at least once.

Such constitution also suppresses release of lithium ions in the first region 145 or in the second region 146. In particular, release of lithium ions in the second region 146 is suppressed further. This way, local build-up of metal lithium onto the negative electrode 130 is suppressed and lithium ions are absorbed more uniformly across the entire negative electrode 130.

Fifth Embodiment

Figure 9:
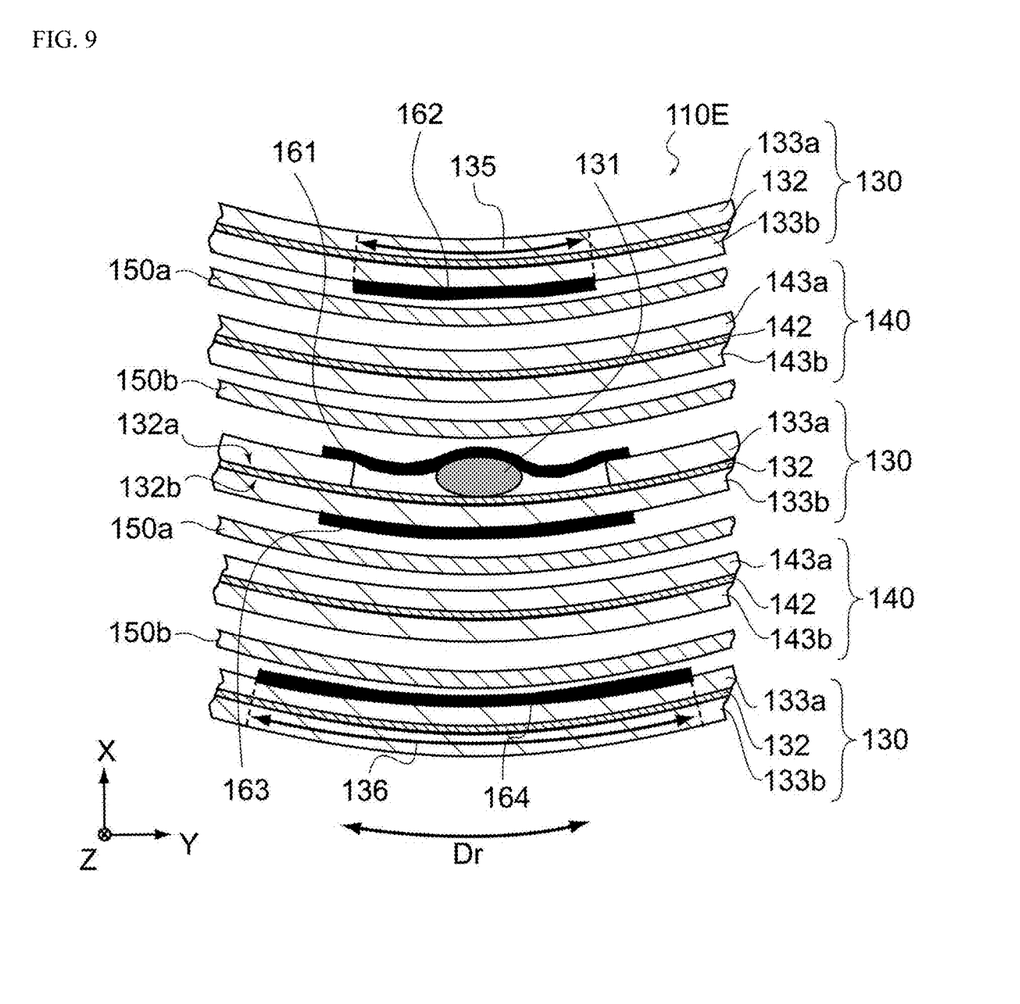
FIG. 9 is a schematic cross-sectional view, along the X-Y plane, of the electric storage element 110E pertaining to the fifth embodiment.

FIG. 9 is a schematic cross-sectional view, along the X-Y plane, of an electric storage element 110E pertaining to the fifth embodiment. FIG. 9 shows a schematic cross-sectional view, along the X-Y plane, of the vicinity of the negative-electrode terminal 131 of the electric storage element 110E.

The electric storage element 110E comprises the winding structure 111, a negative-electrode terminal 131, a positive-electrode terminal 141, and protective tapes 161, 162, 163, 164. In the electric storage element 110E, the negative electrode 130 has, in a part facing the protective tape 161 via the separator 150b and positive electrode 140, a third region 135 where absorption of lithium ions can be suppressed.

In the third region 135, the negative-electrode active material layer 133b is covered by the protective tape 162. The third region 135 may be structured in such a way that the negative-electrode active material layer 133b is not provided and the principal face 132b of the negative-electrode collector 132 is exposed. Also, the width of the third region 135 is smaller than the width of the protective tape 161 in the winding direction Dr.

Furthermore, in the electric storage element 110E, the negative electrode 130 may have, in a part facing the protective tape 163 via the separator 150 and positive electrode 140, a fourth region 136 where absorption of lithium ions can be suppressed. In this case, the negative-electrode terminal 131 is positioned between the third region 135 and the fourth region 136.

In the fourth region 136, the negative-electrode active material layer 133a is covered by the protective tape 164. The fourth region 136 may be structured in such a way that the negative-electrode active material layer 133a is not provided and the principal face 132a of the negative-electrode collector 132 is exposed. Also, the width of the fourth region 136 is greater than the width of the protective tape 163 in the winding direction Dr.

Such constitution also suppresses absorption of lithium ions in the third region 135 or in the fourth region 136. This way, local build-up of metal lithium onto the negative electrode 130 is suppressed and lithium ions are absorbed more uniformly across the entire negative electrode 130.

The foregoing explained the embodiments of the present invention; however, it goes without saying that the present invention is not limited to the aforementioned embodiments and that various changes can be added thereto. According to the constitution illustrated in FIG. 6, for example, the first region 145 is provided on the positive-electrode active material layer 143a on the inner side of the negative-electrode terminal 131, while the second region 146 is provided on the positive-electrode active material layer 143b on the outer side of the negative-electrode terminal 131. In this embodiment, the first region 145 may be provided on the positive-electrode active material layer 143b on the inner side of the negative-electrode terminal 131, while the second region 146 may be provided on the positive-electrode active material layer 143a on the outer side of the negative-electrode terminal 131.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electric storage element, comprising:
a winding structure which comprises: a negative electrode having a negative-electrode collector and a negative-electrode active material layer provided on a principal face of the negative-electrode collector; a positive electrode having a positive-electrode collector and a positive-electrode active material layer provided on a principal face of the positive-electrode collector; and a separator insulating the negative electrode and the positive electrode; wherein the negative electrode, positive electrode, and separator are stacked and wound together, with the negative electrode and the positive electrode separated by the separator;
a negative-electrode terminal which is electrically connected to the negative-electrode collector, extends through the winding structure along a direction of a center axis of winding of the winding structure, and projects from the winding structure;
a positive-electrode terminal which is electrically connected to the positive-electrode collector, extends through the winding structure along the direction of the center axis of winding, and projects from the winding structure; and
a first protective tape which covers the negative-electrode terminal over the length of the negative-electrode terminal in the winding structure on the negative electrode along the direction of the center axis and has lower ion permeability than that of the separator;
wherein the positive electrode has, in a part facing the first protective tape over the length of the first protective tape via the separator in the winding structure, a first region for inhibiting release of lithium ions therefrom, and
wherein a width of the first region is equal to or smaller than a width of the first protective tape in the winding direction of the winding structure.

2. The electric storage element according to claim 1, wherein the positive-electrode active material layer is covered, in the first region, by a second protective tape whose ion permeability is lower than that of the separator.

3. The electric storage element according to claim 1, wherein a thickness of the positive-electrode active material layer in the first region is smaller than a thickness of the positive-electrode active material layer outside the first region, or the positive-electrode active material layer is not provided in the first region.

4. The electric storage element according to claim 1, wherein said electric storage element further has a third protective tape that covers the negative-electrode terminal from a direction opposite the first protective tape, and the third protective tape has lower ion permeability than that of the separator.

5. The electric storage element according to claim 4, wherein the positive electrode further has, in a part facing the third protective tape via the separator, a second region where release of lithium ions can be suppressed, and the negative-electrode terminal is positioned between the first region and the second region.

6. The electric storage element according to claim 5, wherein the positive-electrode active material layer is covered, in the second region, by a fourth protective tape whose ion permeability is lower than that of the separator.

7. The electric storage element according to claim 5, wherein a thickness of the positive-electrode active material layer in the second region is smaller than a thickness of the positive-electrode active material layer outside the first region and the second region, or the positive-electrode active material layer is not provided in the second region.

8. The electric storage element according to claim 5, wherein a width of the second region is equal to or greater than a width of the third protective tape in the winding direction of the winding structure.

9. An electric storage element, comprising:
a winding structure which comprises: a negative electrode having a negative-electrode collector and a negative-electrode active material layer provided on a principal face of the negative-electrode collector; a positive electrode having a positive-electrode collector and a positive-electrode active material layer provided on a principal face of the positive-electrode collector; and a separator insulating the negative electrode and the positive electrode; wherein the negative electrode, positive electrode, and separator are stacked and wound together, with the negative electrode and the positive electrode separated by the separator;
a negative-electrode terminal which is electrically connected to the negative-electrode collector, extends through the winding structure along a direction of a center axis of winding of the winding structure, and projects from the winding structure;
a positive-electrode terminal which is electrically connected to the positive-electrode collector, extends through the winding structure along the direction of the center axis of winding, and projects from the winding structure; and
a first protective tape which covers the negative-electrode terminal over the length of the negative-electrode terminal in the winding structure on the negative electrode along the direction of the center axis and has lower ion permeability than that of the separator;
wherein the positive electrode has, in a part facing the first protective tape over the length of the first protective tape via the separator in the winding structure, a first region for inhibiting release of lithium ions therefrom, and
wherein the positive-electrode active material layer is covered, in the first region, by a second protective tape whose ion permeability is lower than that of the separator.

10. An electric storage element, comprising:
a winding structure which comprises: a negative electrode having a negative-electrode collector and a negative-electrode active material layer provided on a principal face of the negative-electrode collector; a positive electrode having a positive-electrode collector and a positive-electrode active material layer provided on a principal face of the positive-electrode collector; and a separator insulating the negative electrode and the positive electrode; wherein the negative electrode, positive electrode, and separator are stacked and wound together, with the negative electrode and the positive electrode separated by the separator;
a negative-electrode terminal which is electrically connected to the negative-electrode collector, extends through the winding structure along a direction of a center axis of winding of the winding structure, and projects from the winding structure;
a positive-electrode terminal which is electrically connected to the positive-electrode collector, extends through the winding structure along the direction of the center axis of winding, and projects from the winding structure; and
a first protective tape which covers the negative-electrode terminal over the length of the negative-electrode terminal in the winding structure on the negative electrode along the direction of the center axis and has lower ion permeability than that of the separator;
wherein the positive electrode has, in a part facing the first protective tape over the length of the first protective tape via the separator in the winding structure, a first region for inhibiting release of lithium ions therefrom,
wherein said electric storage element further has a third protective tape that covers the negative-electrode terminal from a direction opposite the first protective tape, and the third protective tape has lower ion permeability than that of the separator,
wherein the positive electrode further has, in a part facing the third protective tape via the separator, a second region where release of lithium ions can be suppressed, and the negative-electrode terminal is positioned between the first region and the second region, and
wherein the positive-electrode active material layer is covered, in the second region, by a fourth protective tape whose ion permeability is lower than that of the separator.

11. The electric storage element according to claim 10, wherein a thickness of the positive-electrode active material layer in the second region is smaller than a thickness of the positive-electrode active material layer outside the first region and the second region, or the positive-electrode active material layer is not provided in the second region.

12. The electric storage element according to claim 10, wherein a width of the second region is equal to or greater than a width of the third protective tape in the winding direction of the winding structure.

* * * * *